United States Patent [19]
Karl et al.

[11] Patent Number: 4,836,744
[45] Date of Patent: Jun. 6, 1989

[54] TAKE-AWAY DEVICE FOR TUBING FOILS

[75] Inventors: Veit-Holger Karl, Würzburg; Franz Mahler; Josef Greisel, both of Augsburg, all of Fed. Rep. of Germany

[73] Assignee: Alpine Aktiengesellschaft, Augsburg, Fed. Rep. of Germany

[21] Appl. No.: 199,168

[22] Filed: May 26, 1988

[30] Foreign Application Priority Data

May 27, 1987 [DE] Fed. Rep. of Germany ....... 8707626

[51] Int. Cl.[4] ............................................. B29C 53/20
[52] U.S. Cl. .................... 425/72.1; 264/40.2; 264/40.7; 425/140; 425/150; 425/171; 425/327
[58] Field of Search ............. 425/135, 140, 171, 72.1, 425/326.1, 327, 150; 264/40.2, 40.7, 209.4, 563, 566, 209.2

[56] References Cited

U.S. PATENT DOCUMENTS

| | | | |
|---|---|---|---|
| 3,492,693 | 2/1970 | Clarke et al. | 264/209.2 |
| 3,576,935 | 4/1971 | Dyer et al. | 264/563 |
| 3,632,265 | 1/1972 | Upmeier et al. | 425/326.1 |
| 3,716,322 | 2/1973 | Kratzert | 425/327 X |
| 4,246,212 | 1/1981 | Upmeier et al. | 425/140 X |
| 4,325,897 | 4/1982 | Zerle et al. | 264/40.2 X |
| 4,339,403 | 7/1982 | Upmeier et al. | 264/40.7 X |
| 4,351,785 | 9/1982 | Upmeier et al. | 425/326.1 X |
| 4,643,656 | 2/1987 | Karl | 425/72.1 |
| 4,676,728 | 6/1987 | Planeta | 425/72.1 X |

Primary Examiner—Richard L. Chiesa
Attorney, Agent, or Firm—Pascal & Associates

[57] ABSTRACT

A take-away device for a flattened tubing foil forming machine having an improved foil edge position control. The take-away device for tubing foil is formed by an extruder with a tubing blow head carrying out a blowing process. The tubing foil is flattened between a pair of squeeze rollers, which pair of rollers can reversingly turn about a vertical axis of rotation. At least two turning rods are disposed following the squeeze rollers. The turning rods are pivotable about at least one vertical axis, and have, if necessary, at least one deflecting rod. The rods are pivoted by a frame member about a horizontal axis of rotation. A winding-up device receives the flattened tubing foil from the turning rod. A measuring instrument is disposed between the final turning rod from which the tubing foil is guided to the wind-up device, and the wind-up device. The measuring instrument determines the flow position of the edge of the tubing foil and, when the flow position of the edge deviates from a normal flow position, produces a measurement signal which is dependent on the deviation. The signal is conducted to a control means which converts the measurement signal into a control signal. A frame member supporting at least one rod is connected to a servomotor for receiving the control signal for turning the frame member about a pivot having a vertical axis of rotation, in response to the control signal.

10 Claims, 2 Drawing Sheets

TAKE-AWAY DEVICE FOR TUBING FOILS

FIELD OF THE INVENTION

This invention relates to a take-away device for a tubing foil produced by an extruder with a tubing blow head in a blowing process

DESCRIPTION OF THE PRIOR ART

In the take-away device described in German Pat. No. 19 48 935, and its counterpart U.S. Pat. No. 3,716,322, tubing foil is passed between two squeeze rollers which can be turned about a vertical axis of rotation. From there, the flattened foil is led via a deflecting rod which can be turned together with the squeeze rollers. From there, the foil is led via a turning rod, an additional deflecting rod and an additional turning rod, from where it is fed to a wind-up device where the flattened foil is wound up. The foil is led to the wind-up device via a guide roller by the additional turning rod. The additional deflecting rod cannot be turned about a vertical axis, whereas the two turning rods can be turned about the previously noted vertical axis. The respective rotating position of the two turning rods is controlled by the force of the foil.

From the additional turning rod to the wind-up device, a displacement of the edge of the flattened foil usually occurs. This displacement is all the greater the smaller is the friction between the foil and the deflecting and turning rods. This friction is dependent on the type of processed synthetic material. The result of this edge displacement is that the foil is not properly wound up. With foils in which there is only a very small amount of friction, the foil even tends to slip off at the turning rods.

In order to compensate for this edge displacement, it is common knowledge that an edge control can be provided at the wind-up device. This consists of a measuring instrument, which determines the flow of the edge of the tubing, and two rollers disposed in front of this measuring instrument. The rollers can be turned about an axis extending vertically to the roller axes. This requires two additional rollers at the wind-up device. However, these cannot prevent the tubing foil from slipping off the turning rods if the above-noted synthetic material is used.

Another take-away device, described in German Industrial Design Pat. No. 85 01 177 and its counterpart U.S. Pat. No. 4,643,656, has, in addition to the two squeeze rollers, two or three turning rods which can each be turned about a vertical axis of rotation. The turning motion of these turning rods is determined by the rotation of the squeeze rollers about their vertical axis of rotation. In order to accomplish this, a motor is allocated to every turning rod, which tilts it. An edge displacement also occurs here, depending on the processed synthetic material. Deflecting rods are not provided in this take-away device.

It is the object of the present invention to compensate for this edge displacement by control features within the take-away device.

SUMMARY OF THE INVENTION

In accordance with a preferred embodiment, the invention is take-away device for a tubing foil produced by an extruder with a tubing blow head in a blowing process, in which the tubing foil is flattened between a pair of squeeze rollers which pair of rollers can turn reversingly about a vertical axis of rotation. At least two turning rods are disposed following the squeeze rollers. The turning rods are pivotable about at least one vertical axis, and have, if necessary, at least one deflecting rod. The rods are pivoted by a frame member about a vertical axis of rotation. A wind-up device receives the flattened tubing foil from a turning rod. A measuring instrument is disposed between the final turning rod from which the tubing foil is guided to the wind-up device, and the wind-up device. The measuring instrument determines the flow position of the edge of the tubing foil, and when the flow position of the edge deviates from a normal flow position, produces a measurement signal which is dependent on the deviation. The signal is conducted to a control means which converts the measurement signal into a control signal. A frame member supporting at least one rod is connected to a servomotor for receiving the control signal, for turning the frame member about a pivot having a vertical axis of rotation in response to the control signal.

BRIEF INTRODUCTION TO THE DRAWINGS

Two embodiments of the invention are described in greater detail below, with reference to the drawings, in which.

DETAILED DESCRIPTION OF THE INVENTION

Figure 1:
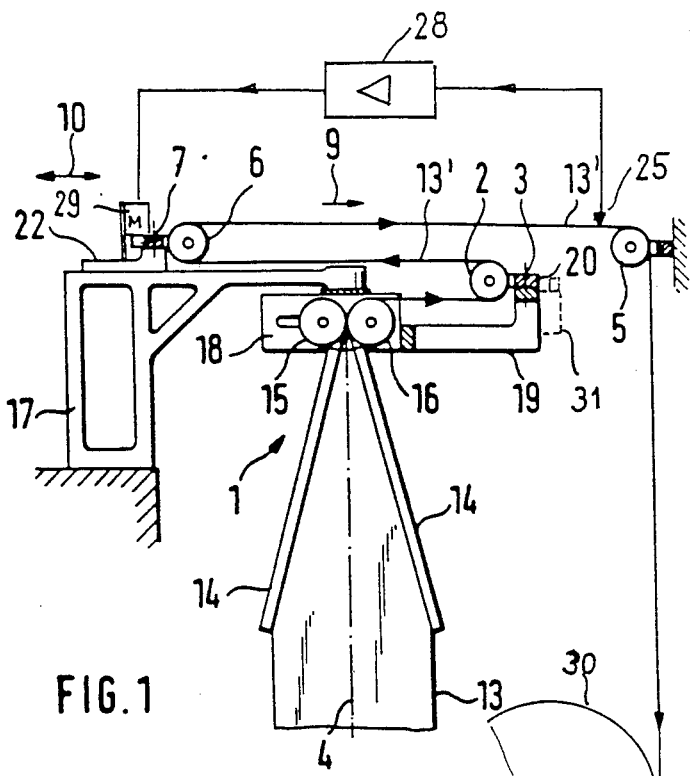
FIG. 1 is a side view of a first embodiment of the take-away device.

The tubing foil 13 coming from a blow head reaches the squeeze rollers 1, where is is flattened between the flattening plates 14. It is then guided through the opening of two take-away rollers or squeeze rollers 15, 16 and, from there, to a first turning rod 2. From this turning rod 2, the flattened tubing foil 13' proceeds to a second turning rod 6 from where it reaches a deflecting roller 5 of the wind-up device, which is designated 30.

The two flattening plates 14 and the take-away rollers 15, 16 are supported by an auxiliary rack 18, which is pivoted by a stationary rack 17 in such a way that the auxiliary rack 18 is pivoted about a vertical axis of rotation 4. This axis of rotation 4 is identical to the center axis of the blow head, which is not shown.

The auxiliary rack 18 has a horizontally extending arm 19 which supports a U-shaped frame 20 which, in turn, supports the turning rod 2. This frame 20 can be turned about a vertical axis 3. The second turning rod 6 is also supported by a U-shaped frame 21 which, in turn, is pivoted about a vertical swivel axis Z7 at an auxiliary frame 22, which can be adjusted at the stationary frame 17 in the direction of arrow 10.

The flattened tubing foil 13' extends in the direction of arrow 9 between the one turning rod 6 and the deflecting roller 5. Its flow is correct when its two edges 23, 24 are equidistant to plane 8, which is determined by vertical axes 4, 7.

A measuring instrument 25, which is comprised of two edge scanners 26, 27, is disposed in the area between the one turning rod 6 and the deflecting roller 5. If these edge scanners 26, 27 pick up a displacement of edges 23, 24 with respect to plane 8, then they produce measurement signals which are applied to a control switch 28. In linear dependency of the measurement signals, the control switch 28 produces control signals which are applied to motor 29 which is disposed on the auxiliary frame 22 and which, when activated, turns the U-shaped frame 21, and therewith turning rod 6, about the vertical axis 7. The motor 29, which is preferably a servomotor, engages the U-shaped frame 21 with its starting pinion and turns this frame 21 about axis 7 relative to the auxiliary frame 22.

Motor 29, which is controlled dependent on the rotary motion of the auxiliary frame 18, therefore carries out an additional control which is determined by the measuring instrument 25.

The flow correction of edges 23, 24 can also be effected via an additional servo motor 31, which is disposed between arm 19 and frame 20 and which turns frame 20, together with turning rod, about axis 3. In this case, the control signals are conveyed to motor 31. Otherwise, motor 31 is controlled dependent on the rotary motion of the auxiliary frame 18.

The measuring instrument 25 can also be disposed directly in front of the take-up device 30.

Figure 2:
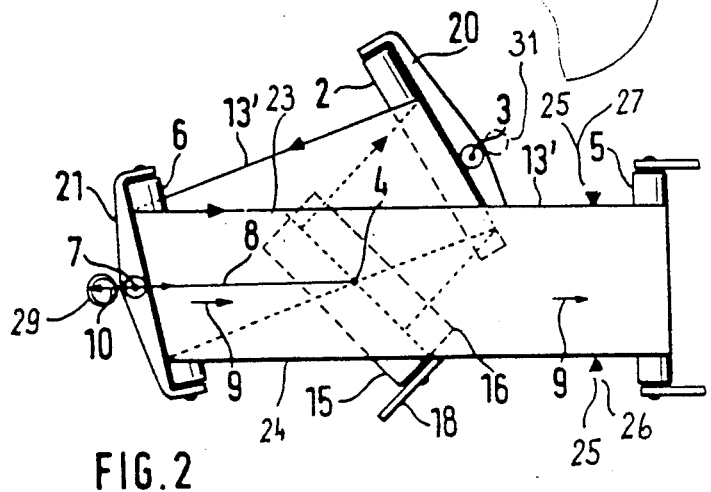
FIG. 2 is a top view of the first embodiment of the take-away device.
Figure 3:
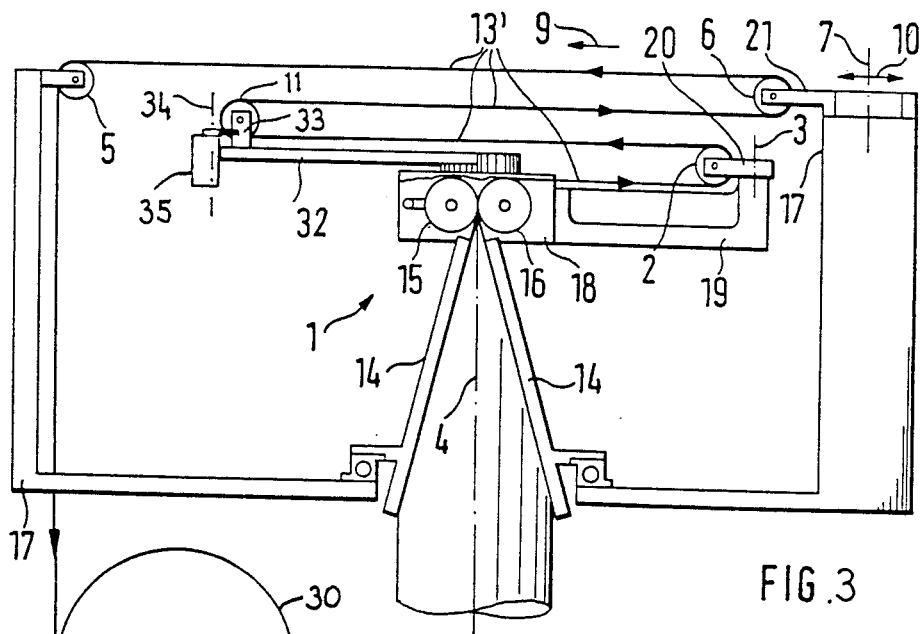
FIG. 3 is a side view of a second embodiment.
Figure 4:
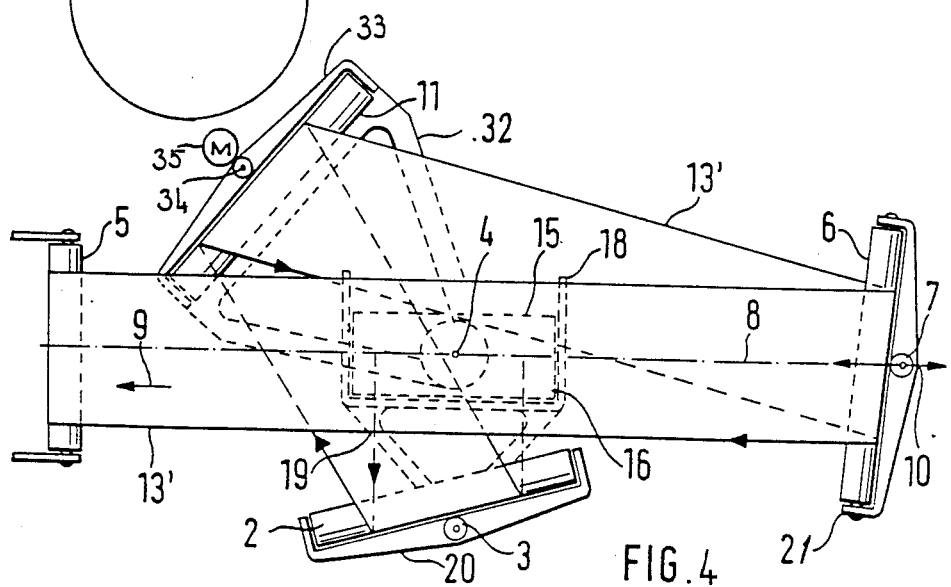
FIG. 4 is a top view of the second embodiment.

In the embodiment according to FIGS. 3 and 4, the same reference numbers are used for the same parts as in FIGS. 1 and 2. In this embodiment, an additional turning rod 11 is provided which is disposed between the first and second turning rods 2, 6 and which is supported by a frame 33. This frame is supported by a pivot mounting 32, which can be turned about the axis of rotation 4. The rotary motion of the pivot mounting 32 takes place dependent on the rotary motion of the auxiliary frame 18.

A pivot, with which frame 33 can be turned about a vertical axis 34 relative to the pivot mounting 32, is provided between frame 33 and pivot mounting 32. A servomotor 35, via which this rotating motion is controlled, is provided between frame 33 and pivot mounting 32. In this case, the control signals are conveyed to this motor 35.

In all cases, the vertical axes of rotation 3, 7, 34, about which the frames 20, 21, 33 are turned when the respective motors 29, 31, 35 receive control signals from the control switch 28, are disposed near the horizontal axes of rotation of the rods 2, 6, 11.

The same principle can be applied in the take-away device mentioned at the beginning of the specification. The turning rod therein, from which the foil leads to the wind-up device, is controlled by the force of the foil, as mentioned at the beginning, with respect to its rotating motion. In this case then, the respective rotating position is corrected by a motor which supports the turning rod at the frame. One can proceed in a similar manner with respect to the two deflecting rods whose frames are also provided with a pivot and a motor, which turns the respective frame, near their horizontal axes of rotation. It is preferred that in the disclosed embodiments the angle of traverse in one of the rods between the final rod and the squeeze rollers should be up to about 10°. It is also preferred that the angle of traverse of the final turning rod should be up to about 5°.

Insofar as reference was made to take-away devices above, one should also understand this to be a reference to a machine, such as a bolting machine, which further processes the flattened tubing foil.

We claim:

1. A take-away device for tubing foil produced by an extruder with a tubing head in a blowing process, in which the tubing oil is flattened between a pair of squeeze rollers which pair of rollers can turn reversingly about a vertical axis of rotation, and having at least two turning rods which are disposed downstream of the squeeze rollers, the turning rods being pivotable about at least one vertical axis, and having at least one deflecting rod, said rods being pivoted by a frame member about a vertical axis of rotation, and further including a wind-up device for receiving the flattened tubing foil from a turning rod, a measuring instrument being disposed between the final turning rod from which the tubing foil is guided to the wind-up device, and the wind-up device, the measuring instrument determining the flow position of the edge of the tubing foil and, when the flow position of the edge deviates from a normal flow position, producing a measurement signal which is dependent on the deviation, the signal being conducted to a control means which converts the measurement signal into a control signal, a frame member supporting at least one rod being connected to a servomotor for receiving the control signal and for turning the frame member about a pivot having a vertical axis of rotation in response to the control signal thereby correcting the position of the tubing foil.

2. A take-away device according to claim 1, in which pivots having vertical axes of rotation turning the frame part members supporting the rods are disposed near the horizontal axes of rotation of the rods.

3. A take-away device according to claim 1 or 2, in which the measuring instrument is disposed between said final turning rod and a guide roller of the wind-up device.

4. A take-away device according to claim 1 or 2, in which the measuring instrument is disposed directly upstream of the wind-up device.

5. A take-away device according to claim 1 or 2, in which the measuring instrument is disposed between said final turning rod and a guide roller of the wind-up device, and in which the angle of traverse of said final turning rod, caused by the control signal being applied to the motor, is up to about 5°.

6. A take-away device according to claim 1 or 2, in which the measuring instrument is disposed directly upstream of the wind-up device, and in which the angle of traverse of said final turning rod, caused by the control signal being applied to the motor, is up to about 5°.

7. A take-away device according to claim 1 or 2, in which the measuring instrument is disposed between said final turning rod and a guide roller of the wind-up device, and in which the angle of traverse, effected by the control signal being applied to said motor, is up to about 10° in the one of the rods located between said final rod and the squeeze rollers.

8. A take-away device according to claim 1 or 2, in which the measuring instrument is disposed directly upstream of the wind-up device, and in which the angle of traverse, effected by the control signal being applied to said motor, is up to about 10° in one of the rods located between said final rod and the squeeze rollers.

9. A take-away device according to claim 1 or 2, in which the measuring instrument is disposed between said final turning rod and a guide roller of the wind-up device, in which the angle of traverse, effected by the control signal being applied to said motor, is up to about 10° in one of the rods located between said final rod and the squeeze rollers, and including a pair of rods located between the final rod and the squeeze rollers, and in which the middle turning rod, with its frame member, is disposed on a pivot mount via a pivot having a vertical axis of rotation, said pivot mount turning about the same axis as the squeeze rollers.

10. A take-away device according to claim 1 or 2, in which the measuring instrument is disposed directly upstream of the wind-up device, in which the angle of traverse, effected by the control signal being applied to said motor, is up to about 10° in one of the rods located between said final rod and the squeeze rollers, and including a pair of rods located between the final rod and the squeeze rollers, and in which the middle turning rod, with its frame member, is disposed on a pivot mount via a pivot having a vertical axis of rotation, said pivot mount turning about the same axis as the squeeze rollers.

* * * * *